(12) United States Patent
Murgan et al.

(10) Patent No.: US 9,113,399 B2
(45) Date of Patent: Aug. 18, 2015

(54) METHOD FOR SEARCHING FOR A RADIO CELL AND MOBILE TERMINAL

(75) Inventors: Tudor Murgan, Munich (DE); Kai Wu, Nuremberg (DE); Stefan Herzinger, Sauerlach (DE); Christian Drewes, Germering (DE); Jean-Xavier Canonici, Cannes (FR); Bertram Gunzelmann, Koenigsbrunn (DE)

(73) Assignee: INTEL DEUTSCHLAND GMBH, Neubiberg (DE)

( * ) Notice: Subject to any disclaimer, the term of this patent is extended or adjusted under 35 U.S.C. 154(b) by 280 days.

(21) Appl. No.: 13/563,855

(22) Filed: Aug. 1, 2012

(65) Prior Publication Data

US 2014/0038587 A1    Feb. 6, 2014

(51) Int. Cl.
*H04W 48/16*    (2009.01)

(52) U.S. Cl.
CPC .................................. *H04W 48/16* (2013.01)

(58) Field of Classification Search
USPC .......................... 455/422.1, 450; 701/31.4, 36
See application file for complete search history.

(56) References Cited

U.S. PATENT DOCUMENTS

| | | | |
|---|---|---|---|
| 2003/0222819 A1* | 12/2003 | Karr et al. ...................... | 342/457 |
| 2011/0034168 A1 | 2/2011 | Lindoff et al. | |
| 2011/0098877 A1* | 4/2011 | Stahlin et al. .................... | 701/33 |
| 2014/0226623 A1* | 8/2014 | Seo et al. ....................... | 370/331 |

* cited by examiner

*Primary Examiner* — Diane Mizrahi (57) ABSTRACT

A method for searching for a radio cell is provided comprising determining, for each of a plurality of frequencies, a reception strength value indicating the reception strength within a first bandwidth around the frequency, wherein the first bandwidth is smaller than a second bandwidth with which a radio cell to be searched is operated; determining, based on the determined reception strength values, a spectral position for a radio cell at which a cell search is to be carried out; and carrying out a cell search at the determined spectral position.

17 Claims, 5 Drawing Sheets

METHOD FOR SEARCHING FOR A RADIO CELL AND MOBILE TERMINAL

TECHNICAL FIELD

The present disclosure relates to methods for searching for a radio cell and mobile terminals.

BACKGROUND

A mobile terminal typically needs to search for a radio cell to camp on when it is switched on and may for example also need to search for candidate radio cells for a handover during operation. Since it is desirable for a user to be reachable as fast as possible after switching on the mobile terminal and since it is further desirable that the components of the mobile terminal are burdened with the cell search as little as possible, efficient methods for cell searching are desirable.

SUMMARY

A method for searching for a radio cell is provided comprising determining, for each of a plurality of frequencies, a reception strength value indicating the reception strength within a first bandwidth around the frequency, wherein the first bandwidth is smaller than a second bandwidth with which a radio cell to be searched is operated; determining, based on the determined reception strength values, a spectral position for a radio cell at which a cell search is to be carried out; and carrying out a cell search at the determined spectral position.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various aspects are described with reference to the following drawings, in which.

DESCRIPTION

The following detailed description refers to the accompanying drawings that show, by way of illustration, specific details and aspects of this disclosure in which the invention may be practiced. These aspects of this disclosure are described in sufficient detail to enable those skilled in the art to practice the invention. Other aspects of this disclosure may be utilized and structural, logical, and electrical changes may be made without departing from the scope of the invention. The various aspects of this disclosure are not necessarily mutually exclusive, as some aspects of this disclosure can be combined with one or more other aspects of this disclosure to form new aspects.

Figure 1:
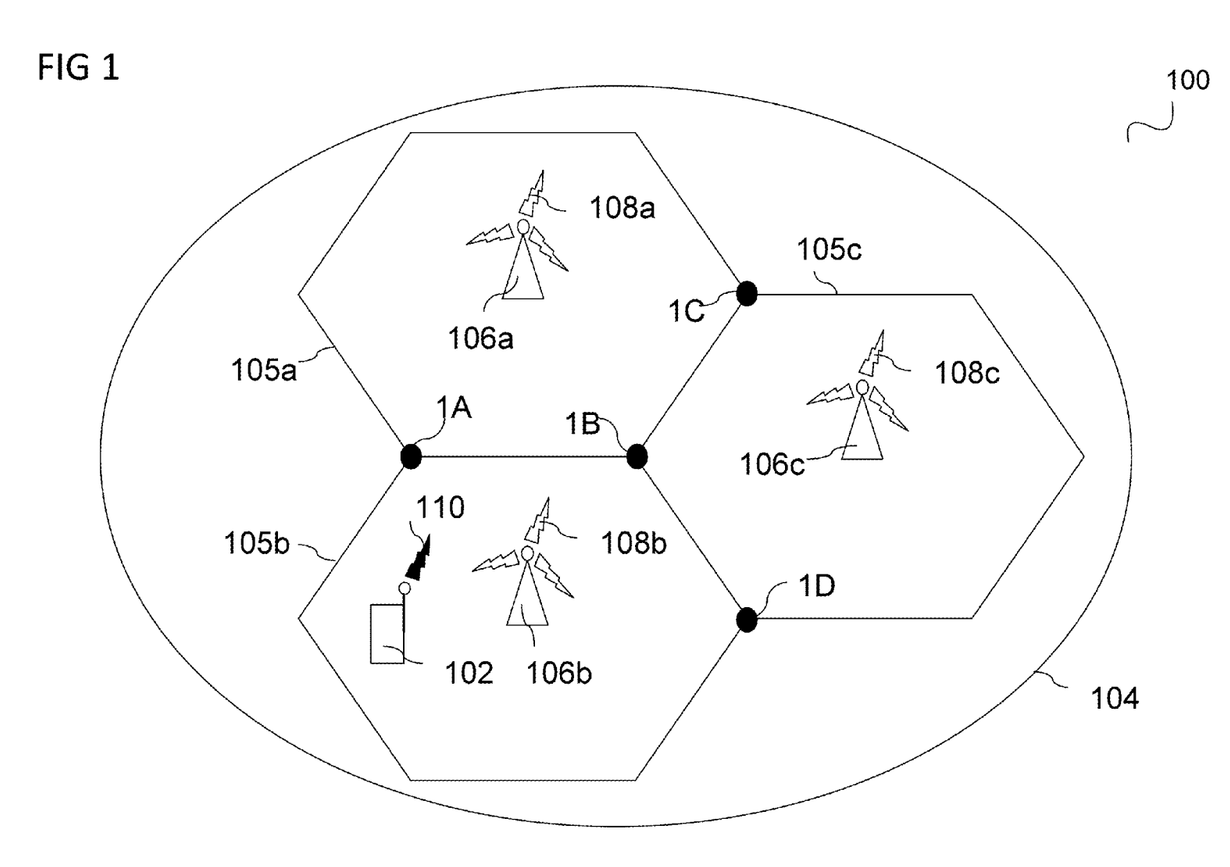
FIG. 1 shows a communications system.

FIG. 1 shows a communications system 100.

The communications system 100 may be configured in accordance with the network architecture of any one of, or any combination of, a LTE (Long Term Evolution) cellular communications system, WLAN (wireless local area network), WiFi, UMTS (Universal Mobile Telecommunications System), GSM (Global System for Mobile Communications), Bluetooth, CDMA2000 (CDMA: Code Division Multiple Access) cellular communications system, etc.

A mobile terminal 102, such as, for example, according to UMTS, a UE (user equipment) equipped with a SIM (Subscriber Identity Module) running on a UICC (Universal Integrated Circuit Card), may be within the area of coverage of a mobile communication network 104, such as, for example, a PLMN (Public Land Mobile Network). The area of coverage of the mobile communication network 104 may be the aggregate result of the coverage of at least one base station belonging to the mobile communication network 104, such as, for example, one, two, three, four, five, six, seven, eight, nine, ten or even more base stations belonging to the mobile communication network 104, such as tens or hundreds of base stations belonging to the mobile communication network 104. By way of an example, the area of coverage of the mobile communication network 104 in FIG. 1 may at least be the aggregate result of the coverage of base stations 106a, 106b, and 106c and others belonging to the mobile communication network 104 (other base stations not shown in FIG. 1).

In FIG. 1, each base station 106a, 106b, and 106c may be configured to transmit a downlink (DL) signal at a particular power to cover a particular geographical area. By way of an example, base station 106a may be configured to transmit DL signals 108a; base station 106b may be configured to transmit DL signals 108b; and base station 106c may be configured to transmit DL signals 108c. The geographical area covered by a particular base station 106a, 106b, or 106c may be substantially (namely, approximately) represented by a cell. By way of an example, the area of coverage of base station 106a may be substantially represented by cell 105a; the area of coverage of base station 106b may be substantially represented by cell 105b; and the area of coverage of base station 106c may be substantially represented by cell 105c. Accordingly, the area of coverage of the mobile communication network 104 may be the result of at least one cell, or the result of a tessellation of a plurality of cells, wherein each cell is an approximation of the area of coverage of a particular base station. By way of an example, area of coverage of the mobile communication network 104 may be the result of the tessellation of cells 105a, 105b, and 105c, wherein each cell is an approximation of the area of coverage of base stations 106a, 106b, and 106c, respectively.

Each cell 105a, 105b, and 105c may be an approximation of the area of coverage of a particular base station 106a, 106b, 106c. Nonetheless, there may be geographical regions that may be served by more than one base station. By way of an example, the geographical region on either side of the boundary formed between points 1A and 1B of FIG. 1 may be served by at least one of base stations 106a and 106b; the geographical region on either side of the boundary formed between points 1B and 1C of may be served by at least one of base stations 106a and 106c; and the geographical region on either side of the boundary formed between points 1B and 1D of may be served by at least one of base stations 106b and 106c.

When the mobile terminal 102 is initially switched off, there is no connection between the mobile terminal 102 and any one of the base stations 106a, 106b, and 106c within the area of coverage of the mobile communication network 104. Accordingly, a mobile terminal 102 that is switched off does not have connectivity to any communications service delivered by the mobile communication network 104. When the mobile terminal 102 is turned on within the area of coverage of the mobile communication network 104, the mobile terminal 102 may be required to search for and identify a base station belonging to the mobile communication network 104 in order to establish an initial communications connection with the mobile communication network 104. By way of an example, mobile terminal 102 may be required to search for and identify any one of, or any combination of 106a, 106b, and 106c in order to be connected to the mobile communication network 104. The mobile terminal may search for and identify one of, or any combination of 106a, 106b, and 106c by receiving and processing the DL signals 108a, 108b, and 108c of the base stations 106a, 106b, and 106c.

Since the area of coverage of each base station may be represented as a cell, searching for and identifying a base station may be considered as searching for and identifying a cell to latch onto. As used herein, latching onto a cell may refer to the mobile terminal 102 starting to camp on a cell which may for example include that the mobile terminal 102 establishes at least one communications channel with the base station serving the cell (e.g. start listening to a broadcast channel and/or a paging channel of the cell). By way of an example, the mobile terminal 102 may latch onto base station 106b in order to establish at least one communications channel in the mobile communication network 104.

A mobile terminal 102 that is initially switched on may search for and identify a cell to latch onto by performing at least one of the following: identifying the frequency (e.g. given by the UARFCN (UMTS Terrestrial Radio Access Absolute Radio Frequency Channel Number)) at which the radio cell is operated, synchronizing slot and frame boundaries between the mobile terminal 102 and the base station serving the cell the mobile terminal 102 is located in; identifying the code group and scrambling code of the base station (and hence, the code group and scrambling code of the cell served by the base station); and acquiring the frequency or frequencies of the base station (and hence, the frequency or frequencies of the cell served by the base station). In this example, the mobile terminal 102 that is initially powered up in FIG. 1 may identify cell 105b served by base station 106b.

When the mobile terminal 102 is switched on, an initial cell search procedure is performed in order to find a (first/initial) suitable radio cell to camp on. Furthermore, on request from the user of the mobile terminal 102 (manual mode) or periodically (automatic mode), the mobile terminal 102 searches for all the PLMNs that are available. For this, the mobile terminal 102 must searches on all possible carriers in the available frequency bands and find the strongest cell 105a, 105b, 105c, i.e. the radio cell 105a, 105b, 105c whose DL signals are received with most signal strength.

For example for UMTS, for that purpose, the mobile terminal 102 can schedule for all UARFCNs, i.e. for all frequencies at which cells might be operated, a complete cell search. Since this may require too much time, first a pre-selection phase may be performed to try avoiding running very long complete searches on all frequencies (i.e. for all UARFCNs) by selecting a subset of UARFCNs for which a cell search is carried out. For example, the pre-selection phase can include performing RSSI (received signal strength indicator) measurements (with various filter widths, i.e. determining RSSIs for various bandwidths) and/or selected stages of a cell search, like Slot Synchronization (SSY).

It is typically desired that the cell search (e.g. initial search or later PLMN search) is carried out as fast as possible. However, when the pre-selection phase includes wideband RSSI measurements, pre-selection and cell search, e.g. for a 3G (e.g. UMTS) system, may be hindered in frequency bands where 2G (e.g. GSM) and 3G carriers overlap (e.g. in 3G Band VIII) by the high noise level produced by 2G carriers (which are not known to the mobile terminal 102 at the time of the cell search).

A fast yet effective RSSI-based pre-selection phase may be provided to ensure fast cell searches (e.g. initial search or later PLMN search) in a frequency region in which a 2G band (i.e. a frequency band used for a 2G communication system such as GSM) and a 3G (i.e. a frequency band used for a 3G communication system such as UMTS) band overlap by avoiding as many as possible full cell searches to be performed for UARFCNs for which the reception energy is high (wideband-wise) but which are not used by the 3G system. Aspects of this disclosure may also be used in context of other communication systems such as LTE communication systems, may be based on other reception strength indicators than RSSIs and other identifications of the spectral position of a radio cell (i.e. the frequency range at which a radio cell is operated) than the UARFCN.

Figure 2:
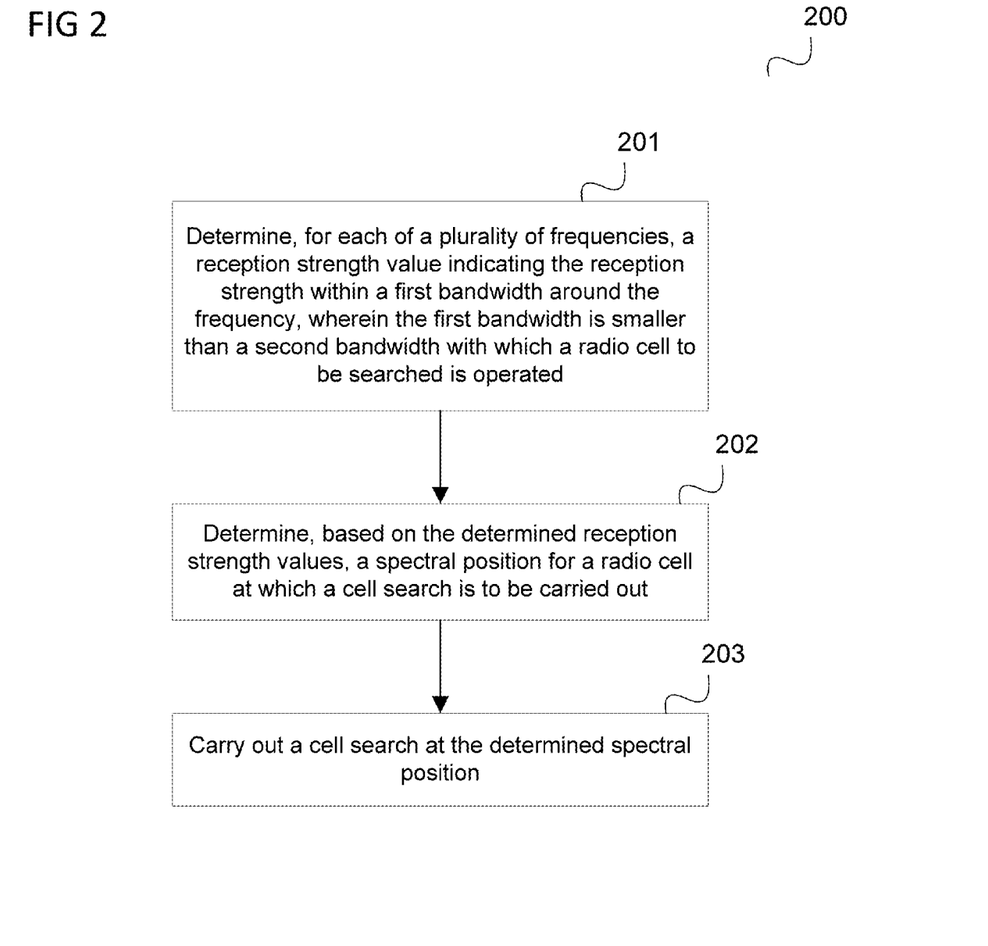
FIG. 2 shows a flow diagram illustrating a method for searching for a radio cell.

A method for searching for a radio cell is illustrated in FIG. 2.

FIG. 2 shows a flow diagram 200.

The flow diagram 200 illustrates a method for searching for a radio cell

In 201, e.g. a mobile terminal determines, for each of a plurality of frequencies, a reception strength value indicating the reception strength within a first bandwidth around the frequency, wherein the first bandwidth is smaller than a second bandwidth with which a radio cell to be searched is operated.

In 202, e.g. the mobile terminal determines based on the determined reception strength values, a spectral position for a radio cell at which a cell search is to be carried out.

In 203, e.g. the mobile terminal carries out a cell search at the determined spectral position.

In other words, a mobile terminal may determine narrowband reception strength values determined, wherein narrowband in this context means that the bandwidth is smaller than the bandwidth in which the cell for which it is searched is operated. Based on the reception strength values, the mobile terminal determines the operating frequency range (in other words the spectral position) at which a cell search is carried out. For example, the mobile terminal determines a frequency range (or spectral position) for which it is likely, based on the determined reception strength values, that a radio cell is located and this frequency range is determined as a candidate for a cell search (including for example trying to read a broadcast channel sending system information of the cell which may for example including determining a frame timing of the cell etc.). The determination of the spectral position (or a plurality of spectral positions) for which a cell search is to be carried out can be seen as a pre-selection of a frequency, e.g. a channel, e.g. in terms of a UARFCN, for a cell search.

For example, fast initial and PLMN 3G cell searches are ensured in frequency bands where 2G and 3G carriers overlap. This may be achieved by combining an energy scan step (i.e. determining reception strength values, e.g. RSSI measurement values) with a similarity factor computation stage to pre-identify the most likely candidates for frequencies at which 3G cells are (spectrally) located.

For example the first bandwidth is smaller or equal to 90%, 80%, 70%, 60%, 50%, 40%, 30%, 20%, 10%, 5%, 4%, 3%, 2%, 1% of the second bandwidth or smaller or equal to even smaller fractions of the second bandwidth. For example, the first bandwidth is 200 kHz and the second bandwidth is 5 MHz. In this context, the first bandwidth is referred to using the term "narrowband" and the second bandwidth is referred to using the term "wideband".

The method may for example be carried out by a mobile terminal that is configured to search for a radio cell of a certain type of communication network, e.g. for a radio cell of a communication network according to one or more predetermined communication standards. The method is however not restricted to the application to cellular communication networks but may also be applied to other types of communication networks. Accordingly, the mobile terminal may know the second bandwidth (or may know a set of second bandwidths that are possible for the radio cell to be searched). The second bandwidth (also referred to as radio cell bandwidth of the cell to be searched) may thus be predefined (or predetermined), e.g., a radio cell according to a certain communication standard (such as UMTS, LTE etc.) or a certain type of communication network (e.g. 2G, 3G or a communication network of one or more certain operators for which the radio cell bandwidth is known) is searched.

The spectral position is for example a frequency (e.g. corresponding to an UARFCN for UMTS) such that a radio cell having a certain frequency as spectral position is operated using the second bandwidth centered around the frequency.

The reception strength value may indicate the reception strength within the first bandwidth centered around the frequency.

The method may include determining, based on the determined reception strength values, a plurality of spectral position for a radio cell at which a cell search is to be carried out.

The method may further include determining, for each spectral position, a priority value for carrying out cell search. This priority is for example determined based on the energy level at the spectral position, e.g. the energy level over the second bandwidth at the spectral position (i.e. over the second bandwidth centered around the frequency corresponding to the central position).

The method according may include carrying out a cell search at the determined spectral positions according to the priority values.

The cell search is for example carried out for the determined spectral positions in an order given by the priority values.

Determining the spectral position for a radio cell at which a cell search is to be carried out for example includes correlating the determined reception strength values with reception strength values to be expected for an operated radio cell; and determining the spectral position based on the result of the correlation.

Determining the spectral position based on the result of the correlation for example includes determining a spectral position of the plurality of spectral positions for which the correlation is above a predetermined threshold as the spectral position.

The method may for example include determining each spectral position of the plurality of spectral positions for which the correlation is above a predetermined threshold as a spectral position for a radio cell at which a cell search is to be carried out and carrying out a cell search at the determined spectral positions.

Determining the spectral position based on the result of the correlation for example includes determining the spectral position of the plurality of spectral positions for which the correlation is maximum as the spectral position.

Determining the spectral position for a radio cell at which a cell search is to be carried out for example includes searching, within the determined reception strength values, for a spectral reception strength value pattern be expected for an operated radio cell.

Determining the spectral position for a radio cell at which a cell search is to be carried out for example includes statistically analyzing the determined reception strength values.

For example, determining the spectral position for a radio cell at which a cell search is to be carried out includes eliminating outliers of the determined reception strength values, e.g. by eliminating reception strength values whose difference to the mean reception strength lies above a predetermined threshold.

For example, the second bandwidth is a radio cell bandwidth according to a communication standard and wherein the cell search is a search for a radio cell operated according to the communication standard.

The plurality of frequencies may for example include all frequencies of a predetermined frequency range at which, according to the communication standard, a radio cell may be operated.

The plurality of frequencies may includes all frequencies of a predetermined frequency range at which, according to the communication standard and according to the applicable frequency licensing regulations (e.g. the frequency licensing regulations to be applied at the location of a mobile terminal conducting the cell search), a radio cell may be operated.

The plurality of frequencies is for example a set of frequencies such that when the frequencies are ordered by increasing or decreasing size to a sequence of frequencies, the difference between two consecutive frequencies in the sequence of frequencies is smaller than the second bandwidth. In other words, the frequencies of the plurality of frequencies are chosen such that more than one reception strength value falls within (i.e. is determined for a frequency within) the bandwidth with which a radio cell is operated.

The first bandwidth is for example equal to or smaller than the minimum difference between the frequencies of the plurality of frequencies. In other words, the spacing between the frequencies is at most the first bandwidth such that, if the reception strength values are determined with the first bandwidth being centered around the frequencies, the frequency ranges for which the reception strength values are determined do not overlap. It should however be noted that if the frequency ranges overlap, a good selection can still be made although the granularity is not as fine. In other words, more frequencies may be used around the center frequency. It should further be noted that the method is applicable also when the spacing between the frequencies is larger than the first bandwidth.

Figure 3:
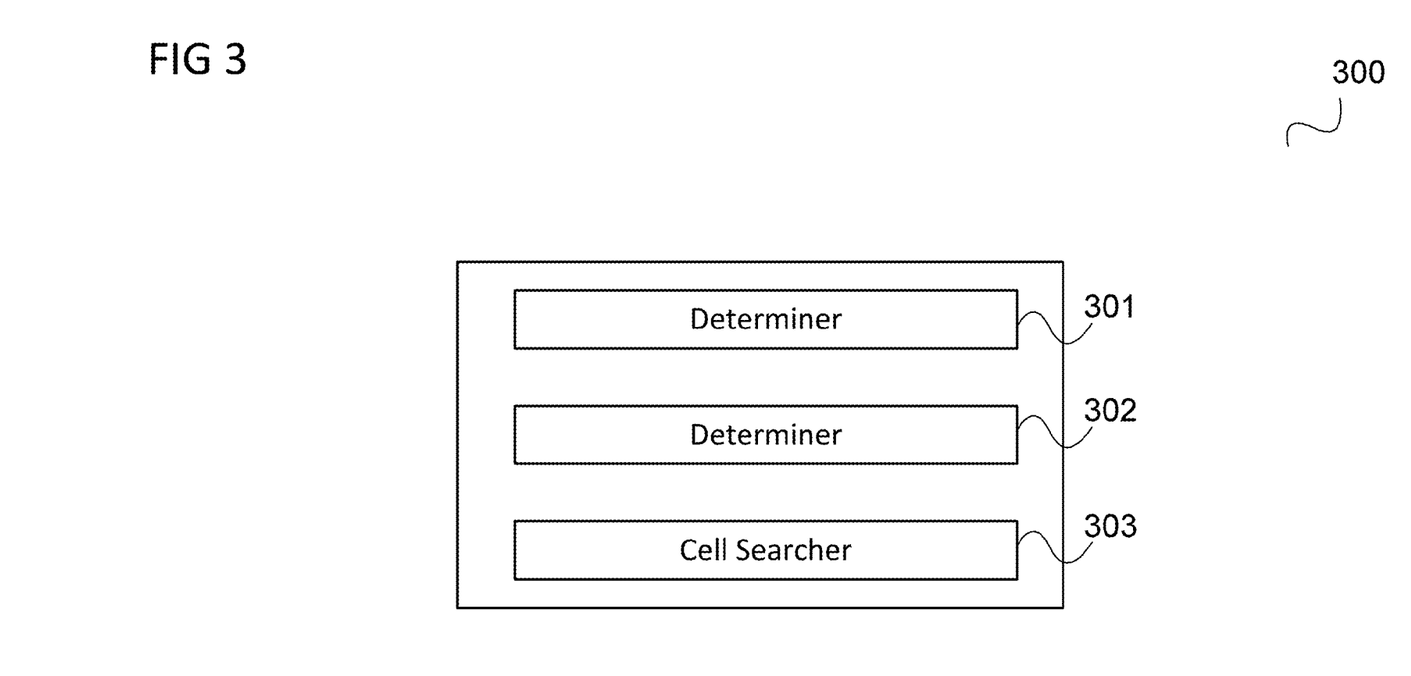
FIG. 3 shows a mobile terminal configured to perform a cell search.

The method illustrated in FIG. 2 is for example carried out by a mobile terminal as shown in FIG. 3.

FIG. 3 shows a mobile terminal 300.

The mobile terminal 300 includes a first determiner 301, configured to determine, for each of a plurality of frequencies, a reception strength value indicating the reception strength within a first bandwidth around the frequency, wherein the first bandwidth is smaller than a second bandwidth with which a radio cell to be searched is operated.

The mobile terminal 300 further includes a second determiner 302, configured to determine, based on the determined reception strength values, a spectral position for a radio cell at which a cell search is to be carried out.

The mobile terminal 300 further includes a cell searcher 303, configured to carry out a cell search at the determined spectral position.

The components of the mobile terminal (first determiner, second determiner and cell searcher) may be implemented by one or more circuits. A circuit may be understood as any kind of a logic implementing entity, which may be special purpose circuitry or a processor executing software stored in a memory, firmware, or any combination thereof. Thus, a circuit may be a hard-wired logic circuit or a programmable logic circuit such as a programmable processor, e.g. a microprocessor (e.g. a Complex Instruction Set Computer (CISC) processor or a Reduced Instruction Set Computer (RISC) processor). A circuit may also be a processor executing software, e.g. any kind of computer program, e.g. a computer program using a virtual machine code such as e.g. Java. Any other kind of implementation of the respective functions which will be described in more detail below may also be understood as a circuit.

It should be noted that aspects described in context of the method illustrated in FIG. 2 are analogously valid for the mobile terminal 300 and vice versa.

An example is described in the following in more detail.

In the following, it is assumed that the mobile terminal 102 is located at a geographical position in which it can receive both signals from base stations of a 3G communication network (e.g. a UMTS network), e.g. corresponding to the mobile communication network 104, and from base stations of 2G communication network (e.g. a GSM network).

Figure 4:
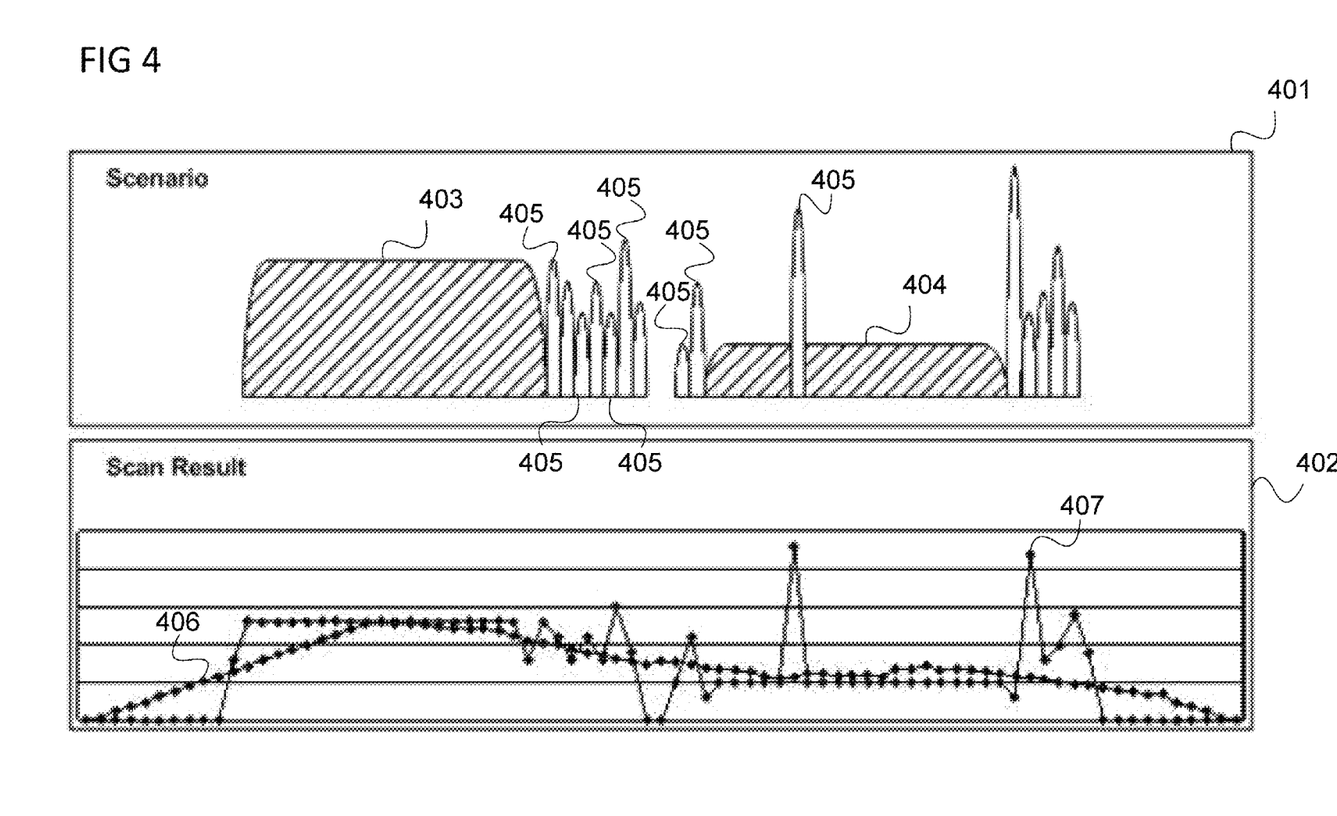
FIG. 4 shows a signal strength diagram and a scan result diagram corresponding to an exemplary radio cell scenario.

This scenario is illustrated in FIG. 4.

FIG. 4 shows a signal strength diagram 401 and a scan result diagram 402.

In the signal strength diagram 401 it is assumed that frequency increases from left to right and the strength of signals that can be received for a certain frequency at the location of the mobile terminal is indicated by the height of the graphs shown in the signal strength diagram 401 at the respective frequency.

In this case, it is assumed that signals of a first 3G radio cell (i.e. from a base station operating a first radio cell) and of a second 3G radio cell can be received. Accordingly, a first graph (shown with hatching of the area below the graph) has a first high-value region 403 corresponding to the first 3G radio cell and a second high-value region 404 corresponding to the second 3G radio cell. The width of the first high-value region 403 and the width of the second high-value region 404 is for example, according to UMTS, 5 MHz.

Further, it is assumed that signals of a plurality of 2G radio cells (i.e. from base stations operating 2G radio cells) can be received. Accordingly, a second graph (shown without hatching of the area below the graph) has a plurality of high-value regions 405, wherein each high-value region corresponds to a 2G radio cell. The width of the high-value regions 405 is for example, according to GSM, 200 kHz.

The 5 Mhz according to UMTS and the 200 kHz can be seen as the bandwidth at which the UMTS radio cells or the GSM cells, respectively, are operated.

In a scenario as illustrated by the signal strength diagram 401, 2G carriers (i.e. signals of the 2G radio cells received) may produce a high noise level and hinder significantly 3G initial cell search and PLMN search that use wideband RSSI scan for pre-selecting good candidates for spectral cell positions in order to schedule complete initial and/or PLMN searches. Using a wideband filter and classifying the energy scan results does not give enough information and UARFCNs that exhibit large wideband RSSI but are unlikely to be 3G cells, cannot be always pre-excluded from scheduling cell search procedures. This is illustrated by the scan result diagram 402.

Frequency increases from left to right in the scan result diagram 402 and the same horizontal position in the signal strength diagram 401 and the scan result diagram 402 corresponds to the same frequency. A first graph 406 indicates the RSSI measurement values determined using a wideband filter (e.g. with a bandwidth of 5 MHz). This means that for a specific frequency, the point of the first graph 406 indicates by its vertical position (wherein points further at the top of the scan result diagram correspond to larger values) the signal strength within the bandwidth of the filter (e.g. 5 MHz), i.e. within the frequency region having the bandwidth of the filter and being centered at the frequency.

As can be seen from the first graph 406, it may be difficult to (spectrally) locate the first 3G cell and the second 3G cell because the determined RSSI values also include the strength of the signals of the 2G cells.

One example can be seen to exploit the fact that in real scenarios, the energy levels of 2G cells varies much stronger than that of narrowband RSSI values (e.g. determined for a bandwidth of 200 kHz) within a 3G cell. Specifically, narrowband RSSI values for all bands (e.g. for 200 kHz bands with a 200 kHz step between the center frequencies of the bands) may be collected. This is illustrated by a second graph 407 which, similarly as the first graph 406, illustrates determined RSSI values but, in contrast to being based on the usage of a wideband (5 Mhz) filter, being based on a narrowband (200 kHz) filter.

In this example, a (narrowband) RRSI value is determined for every UARFCN (and thus in 200 kHz steps).

From the narrowband RSSK values, for each UARFCN, a similarity factor (e.g. correlation coefficient) to the expected measurement of an ideal 3G cell (operated at the frequency corresponding to the UARFCN) is calculated. Finally, the UARFCNs with a similarity factor lower than one or more thresholds are given a lower priority for the scheduling of the subsequent cell search procedures, i.e. a cell search at one of these UARFCNs is given a low priority. In several scenarios thus, initial and PLMN cell search can be sped up to more than 10 times (with respect to wideband-only strategies, e.g. based on a RSSI determination as illustrated by the first graph 406).

Figure 5:
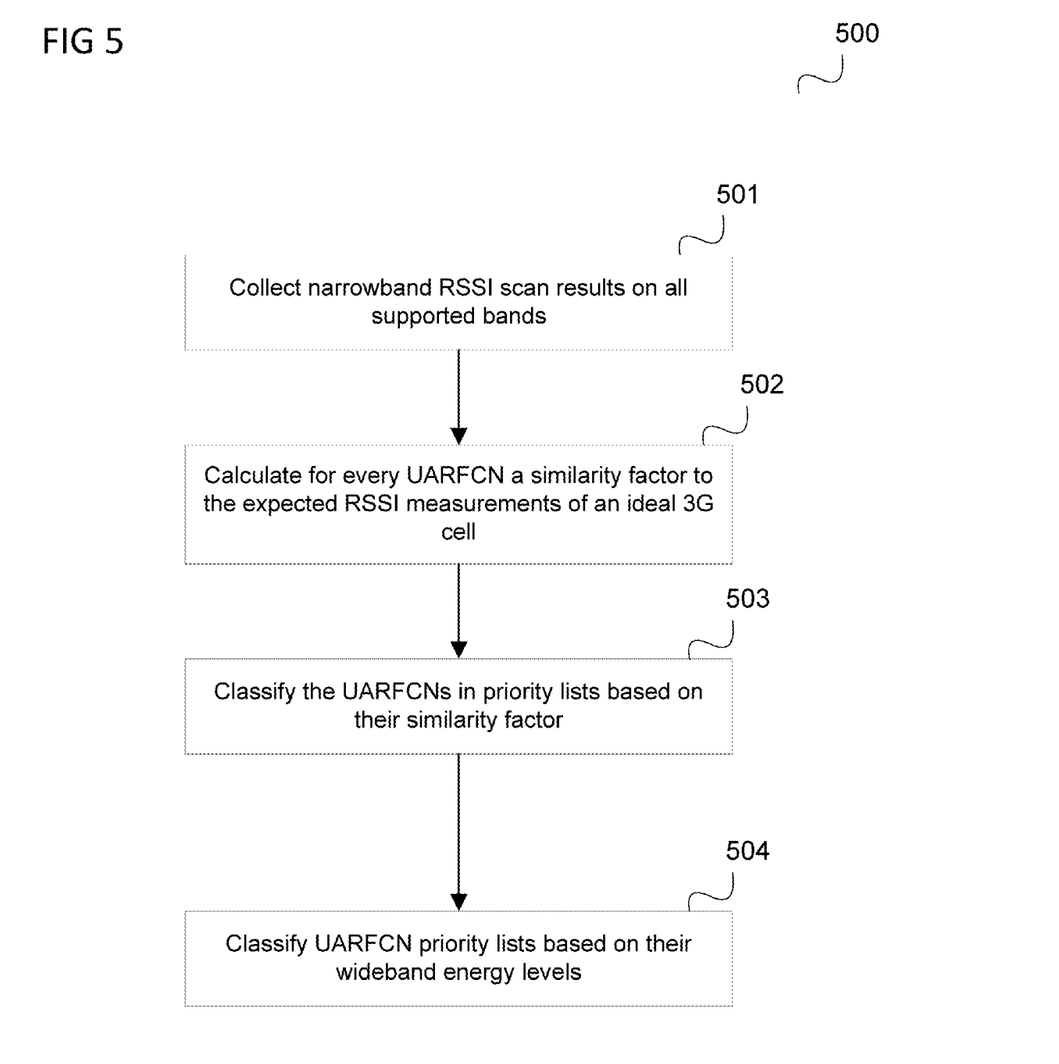
FIG. 5 shows a flow diagram illustrating procedure for identifying and ranking spectral positions for a cell search.

An example for a cell search procedure is given in FIG. 5.

FIG. 5 shows a flow diagram 500i.

In 501, a mobile terminal collects narrowband RSSI scan results (i.e. RSSI measurement values) on all supported bands (e.g. in the frequency ranges in which a cell should or can be searched).

In 502, for every UARFCN, the mobile terminal calculates a similarity factor (e.g. a correlation coefficient) to the expected RSSI measurements of an ideal 3G cell.

A correlation coefficient can for example be calculated as follows. Let X be an array of narrowband RSSI measurements $(x_i)$, $x_i=1, \ldots n$, around one UARFCN, i.e. around one frequency given by the UARFCN (e.g. symmetrically around the UARFCN with a certain frequency step, e.g. every 200 kHz) and let Y be an array of the corresponding expected measurements (yi), i=1, . . . , n, of an ideal 3G cell. The correlation (or cross-correlation) coefficient r may for example be calculated as follows:

$$r = \frac{cov(X, Y)}{\sigma_X \cdot \sigma_Y} = \frac{\sum_{i=1}^{n} x_i y_i - n\bar{x}\bar{y}}{\sqrt{\sum_{i=1}^{n} x_i^2 - n\bar{x}^2} \cdot \sqrt{\sum_{i=1}^{n} y_i^2 - n\bar{y}^2}}$$

wherein $\bar{x}$ is the average value of the $x_i$ and $\bar{y}$ is the average value of the $y_i$.

In 503, the mobile terminal classifies the UARFCNs in priority lists based on their similarity factor. For example, the mobile terminal classifies the UARFCNs with low similarity factors (e.g. lower than one or more pre-defined thresholds) in lists with low priorities—e.g. irrespective of their estimated/measured wideband energy levels. In other words, such UARFCNs are masked for the cell search.

For example, after the narrowband RSSI measurements are done and all results are collected, the correlation coefficient r as above is calculated for all UARFCNs. If r is lower than one or more pre-defined thresholds, then those UARFCNs are masked out and/or classified in low priority cell search lists and can be either excluded from the cell search or ranked as low priority searches. Consequently, since long low-priority cell searches may become obsolete, unsuccessful long initial and PLMN cell searches can be avoided.

In 504, the mobile terminal classifies the UARFCN priority lists based on their wideband energy levels. For example, the mobile terminal classifies (e.g. ranks) the UARFCNs within the priority lists based on their wideband energy levels. In other words, subsets of the UARFCNs (i.e. of all UARFCNs corresponding to frequencies within the supported bands) are determined based on the determination of the similarity factor and, in this example, the UARFCNs of the subsets are ranked based on the wideband energy levels (e.g. the wideband filter results as illustrated by the first graph 406) for a cell search. These wideband energy levels (e.g. wideband RSSI scan results) may be determined in a separate measurement or may be determined from the narrowband RSSI scan results. It should be noted that the UARFCNs of the subset may also be ranked based on the similarity factor or a combination of the similarity factor and the wideband energy level. The mobile terminal may then perform a cell search starting with the UARFCNs in the cell search list with highest priority and proceeding in accordance with the ranking of the UARFCNs within the cell search list and, e.g. if the search should be continued, e.g. in case no cell is found, continue with the cell search list with next lower priority and so on.

It should be noted that knowledge from or about radio cells on which the mobile terminal 102 has camped previously can be taken into account for the cell search or for determining the candidate frequencies at which a cell search is carried out.

Further, the narrowband scan results can be combined with speed information (if available from, e.g., a GPS sensor of the mobile terminal 102) to modify thresholds that trigger further detailed cell searches.

A 200 kHz wide filter fits nicely to 2G systems. Different filter bandwidths are possible, as well, to increase the accuracy (smaller bandwidth) or to accelerate the initial scan (larger bandwidth) leading to hierarchical scans.

Before conducting the narrowband scan, a scan with wider bandwidth can be done first to identify junks of carrier frequency candidates which can either be excluded (RSSI is too low) or which can be scanned with a narrowband filter (RSSI is sufficiently high). Such a hierarchical scan is also possible with more than two filter bandwidths.

It should be noted that the narrowband scan can be done in regular intervals in idle mode to reselect to higher priority networks or higher priority RATs (Radio Access Technologies) or better frequency bands.

The above aspects, described in context of a 3G system, can also be applied to other communication systems such as LTE or other radio systems (such as any one of the ones mentioned above in context of FIG. 1). In an LTE communication network, the narrowband scan can be additionally used to detect the bandwidth of the LTE signal, i.e. of the radio cell since this can vary according to LTE (between 1.4 and 20 MHz).

Next to cell search, a narrowband scan can be used to detect interference from other RATs onto the RAT used by the radio cell on which the mobile terminal 102 currently camps, e.g., interference from 2G cells onto 3G cells using the same frequency band as the radio cell on which the mobile terminal 102 currently camps. Instead of other RATs, the same RAT might also interfere with itself, e.g. in an LTE deployment of macro and micro cells where the micro cells might belong to a closed subscriber group interfering with the macro cell that is open for all subscribers of a specific operator and where the micro cell has a smaller bandwidth than the macro cell. Extensions to different mixes of femto cells/pico cells/micro cells/macro cells etc. with different bandwidths are also possible.

A narrowband scan might also be used to detect interference from neighboring systems in the frequency domain, e.g. WLAN operating in ISM band interfering to LTE operating in band 40. In this case, the narrowband scan result can be used to guide in-device coexistence mechanisms.

While specific aspects have been described, it should be understood by those skilled in the art that various changes in form and detail may be made therein without departing from the spirit and scope of the aspects of this disclosure as defined by the appended claims. The scope is thus indicated by the appended claims and all changes which come within the meaning and range of equivalency of the claims are therefore intended to be embraced.

What is claimed is:

1. A method for searching for a radio cell comprising:
determining, for each of a plurality of frequencies, a reception strength value indicating the reception strength within a first bandwidth around the frequency, wherein the first bandwidth is smaller than a second bandwidth with which a radio cell to be searched is operated;
determining, based on the determined reception strength values, a spectral position for a radio cell at which a cell search is to be executed; and
executing a cell search at the determined spectral position;
wherein determining the spectral position for the radio cell comprises statistically analyzing the determined reception strength values.

2. The method according to claim 1, wherein the reception strength value indicates the reception strength within the first bandwidth centered around the frequency.

3. The method according to claim 1, wherein determining the spectral position for a radio cell at which a cell search is to be executed comprises correlating the determined reception strength values with reception strength values to be expected for an operated radio cell;
and determining the spectral position based on the result of the correlation.

4. The method according to claim 3, wherein determining the spectral position based on the result of the correlation comprises determining a spectral position of a plurality of spectral positions for which the correlation is above a predetermined threshold as the spectral position.

5. The method according to claim 4, comprising determining each spectral position of the plurality of spectral positions for which the correlation is above a predetermined threshold as a spectral position for a radio cell at which a cell search is to be executed; and
executing a cell search at the determined spectral positions.

6. The method according to claim 3, wherein determining the spectral position based on the result of the correlation comprises determining the spectral position of the plurality of spectral positions for which the correlation is maximum as the spectral position.

7. The method according to claim 1, wherein determining the spectral position for a radio cell at which a cell search is to be executed comprises searching, within the determined reception strength values, for a spectral reception strength value pattern Dell expected for an operated radio cell.

8. The method according to claim 1, wherein determining the spectral position for a radio cell at which a cell search is to be executed comprises eliminating outliers of the determined reception strength values.

9. The method according to claim 1, wherein the second bandwidth is a radio cell bandwidth according to a communication standard and wherein the cell search is a search for a radio cell operated according to the communication standard.

10. The method according to claim 1, wherein the plurality of frequencies comprises all frequencies of a predetermined frequency range at which, according to the communication standard, a radio cell may be operated.

11. The method according to claim 1, wherein the plurality of frequencies is a set of frequencies such that when the frequencies are ordered by increasing or decreasing size to a sequence of frequencies, the difference between two consecutive frequencies in the sequence of frequencies is smaller than the second bandwidth.

12. The method according to claim 1, wherein the first bandwidth is equal to or smaller than the minimum difference between the frequencies of the plurality of frequencies.

13. A method for searching for a radio cell comprising:
   determining, for each of a plurality of frequencies, a reception strength value indicating the reception strength within a first bandwidth around the frequency, wherein the first bandwidth is smaller than a second bandwidth with which a radio cell is operated;
   determining, based on the determined reception strength values, a plurality of spectral positions for a radio cell at which a cell search is to be executed;
   determining, for each spectral position, a priority value for executing a cell search; and
   executing a cell search at the determined spectral positions.

14. The method according to claim 13, wherein each cell search at the determined spectral positions is executed according to the priority values.

15. The method according to claim 14, wherein the cell search is executed for the determined spectral positions in an order given by the priority values.

16. A method for searching for a radio cell comprising:
   determining, for each of a plurality of frequencies, a reception strength value indicating the reception strength within a first bandwidth around the frequency, wherein the first bandwidth is smaller than a second bandwidth with which a radio cell is operated;
   determining, based on the determined reception strength values, a spectral positing for a radio cell at which a cell search is to be executed; and
   executing a cell search at the determined spectral position;
   wherein the plurality of frequencies comprises all frequencies of a predetermined frequency range at which, according to the communication standard and according to the applicable frequency licensing regulations, a radio cell may be operated.

17. A mobile terminal comprising:
   a first determiner, configured to determine, for each of a plurality of frequencies, a reception strength value indicating the reception strength within a first bandwidth around the frequency, wherein the first bandwidth is smaller than a second bandwidth with which a radio cell to be searched is operated;
   a second determiner, configured to determine, based on the determined reception strength values, a spectral position for a radio cell at which a cell search is to be executed; and
   a cell searcher, configured to execute a cell search at the determined spectral position
   wherein the second determiner is configured to statistically analyze the determined reception strength values.

* * * * *

UNITED STATES PATENT AND TRADEMARK OFFICE
CERTIFICATE OF CORRECTION

PATENT NO.         : 9,113,399 B2                      Page 1 of 1
APPLICATION NO.    : 13/563855
DATED              : August 18, 2015
INVENTOR(S)        : Tudor Murgan et al.

It is certified that error appears in the above-identified patent and that said Letters Patent is hereby corrected as shown below:

In the Claims:

Claim 7 - Column 11, line 5: delete "value pattern Dell expected for an" and write --value pattern expected for an-- in place thereof.

Claim 16 - Column 12, line 15: delete "values, a spectral positing for a radio cell" and write --values, a spectral positioning for a radio cell-- in place thereof.

Signed and Sealed this
Twenty-fourth Day of May, 2016

Michelle K. Lee
*Director of the United States Patent and Trademark Office*